US006262218B1

United States Patent
Inoue et al.

(10) Patent No.: US 6,262,218 B1
(45) Date of Patent: Jul. 17, 2001

(54) OPTICAL QUALITY POLYCARBONATES WITH REDUCED STATIC CHARGE AND METHOD FOR MAKING SAME

(75) Inventors: Kazushige Inoue; Hiromi Ishida, both of Moka; Tomoaki Shimoda, Ichihara, all of (JP); Theodorus L. Hoeks, Bergen op Zoom (NL); Henricus H. M. van Hout, Halsteren (NL); Monica M. Marugan, Bergen op Zoom (NL); David M. Dardaris, Ballston Spa; Patrick J. McCloskey, Watervliet, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/450,408

(22) Filed: Nov. 29, 1999

Related U.S. Application Data

(63) Continuation of application No. 09/287,668, filed on Apr. 7, 1999, now Pat. No. 6,022,943.

(51) Int. Cl.[7] .................................................. C08G 64/00
(52) U.S. Cl. ............................................ 528/196; 528/198
(58) Field of Search ...................................... 528/196, 198

(56) References Cited

U.S. PATENT DOCUMENTS

| | | | |
|---|---|---|---|
| 4,460,752 | | 7/1984 | Nueray et al. ...................... 525/462 |
| 4,774,315 | * | 9/1988 | Miller ................................... 528/179 |
| 5,026,817 | * | 6/1991 | Sakashita et al. .................... 528/199 |
| 5,097,002 | * | 3/1992 | Sakashita et al. .................... 528/199 |
| 5,142,018 | * | 8/1992 | Sakashita et al. .................... 528/199 |
| 5,606,007 | * | 2/1997 | Sakashita et al. .................... 528/176 |
| 5,644,017 | * | 7/1997 | Drumright et al. .................. 528/196 |
| 5,668,202 | * | 9/1997 | Hirata et al. .......................... 524/154 |
| 5,717,056 | * | 2/1998 | Varadarajan et al. ................ 528/196 |
| 6,022,943 | * | 2/2000 | Inoue et al. .......................... 528/196 |

FOREIGN PATENT DOCUMENTS

| | | |
|---|---|---|
| 078943 | 5/1983 | (EP) . |
| 0360578A | 3/1990 | (EP) . |
| 0709421 A | 5/1996 | (EP) . |
| 0980861A | 2/2000 | (EP) . |
| 62207358 | 9/1987 | (JP) . |
| 03047831 | 2/1991 | (JP) . |
| WO 9845246 | 10/1998 | (WO) . |

OTHER PUBLICATIONS

International Search Report for International Application No. PCT/US 00/07167.

* cited by examiner

Primary Examiner—Terressa M. Boykin

(57) ABSTRACT

Increasing the endcap level to a level greater than about 90% for Optical Quality (OQ) Melt Polycarbonate significantly reduces the as-molded static charge for injection molded parts for Optical Disc applications. The use of resins with higher endcap levels in combination with antistatic additives provides a highly robust formulation suitable for even the most demanding emerging formats as Digital Versatile Disc (DVD) and in all commercial Optical media molding machines. Thus, optical quality polycarbonates are prepared by performing a base-catalyzed polymerization of a diaryl carbonate and a dihydric phenol under conditions effective to produce a polycarbonate product having an endcap level of 90% or greater.

20 Claims, No Drawings

OPTICAL QUALITY POLYCARBONATES WITH REDUCED STATIC CHARGE AND METHOD FOR MAKING SAME

This is a continuation of Ser. No. 09/287,668 filed Apr. 7, 1999 now U.S. Pat. No. 6,022,943.

CROSS REFERENCE TO RELATED PATENTS

None

STATEMENT REGARDING FEDERALLY SPONSORED RESEARCH

Not applicable.

BACKGROUND OF THE INVENTION

This application relates to optical quality polycarbonates having reduced static charge, and to methods of preparing such materials.

Polycarbonates have become the material of choice for the manufacture of optical information storage media such as audio disks, digital video disks, laser disks, optical disk memories and magneto-optical disks to which information may be written and from which it may be read from a laser. For use in these applications, polycarbonates are preferably made by a melt process, such as that disclosed in U.S. Pat. No. 5,606,008, which is incorporated herein by reference. This type of process not only avoids the use of highly toxic phosgene, which is required for manufacture of polycarbonates using the older interfacial (IF) process, it also provides a product with superior optical properties. One of the challenges facing polycarbonates manufactured using a melt process, however, is the control of static charge, since such static charge can itself interfere with read/write functions and attract a film of dust which also reduces the performance of the optical information storage media prepared with the polycarbonate.

Reduction of static charge in polycarbonates has generally been achieved through the introduction of antistatic additives. For example, Japanese Patent No. 62207358 discloses the use of phosphoric acid esters as antistatic agents, while U.S. Pat. No. 5,668,202 discloses the use of sulfonic acid sulfonium salts. Additional additives which can function as antistatic agents are distearylhydroxylamine, triphenylphosphine oxide, pyridine-N-oxide and polyoxyethylene compounds as disclosed in commonly assigned U.S. patent application Ser. No. 08/989,552, filed Dec. 12, 1997, and Ser. No. 09/161,563, filed Sep. 28, 1998, which are incorporated herein by reference.

While such additives are effective to a substantial extent, they are not without some drawbacks. Like all additives which are not an integral part of the polymer structure, they are prone to leaching, and may also undergo side reactions or otherwise impair the properties of the polycarbonate product. Thus, there remains room for improvement in the manufacture of optical quality polycarbonates.

It is an object of the present invention to provide optical quality polycarbonates with reduced static charge.

It is a further object of the present invention to provide a method for making such polycarbonates.

SUMMARY OF THE INVENTION

We have discovered that increasing the endcap level to a level greater than about 90% for Optical Quality (OQ) Melt Polycarbonate significantly reduces the as-molded Static charge for injection molded parts for Optical Disc applications. The use of resins with higher endcap levels in combination with antistatic additives provides a highly robust formulation suitable for even the most demanding emerging formats, such as Digital Versatile Disc (DVD) and in all commercial Optical media molding machines. Thus, in accordance with the present invention, optical quality polycarbonates are prepared by a method comprising performing a base-catalyzed polymerization of a diaryl carbonate and a dihydric phenol under conditions effective to produce a polycarbonate product having an endcap level of 90% or greater.

DETAILED DESCRIPTION OF THE INVENTION

Polycarbonate resins are prepared in a melt process by the reaction of a diaryl carbonate and a dihydric phenol in the presence of a basic catalyst. Commonly, the diaryl carbonate is diphenyl carbonate and the dihydric alcohol is bisphenol A, and these reactants will be used for exemplary purposes throughout the present application. Many alternative materials have been proposed for use in preparing polycarbonates, however, and the utilization of such alternative materials is intended to be within the scope of the present invention.

When diphenyl carbonate reacts with bisphenol A, it produces a growing polymer having a reactive hydroxyl group which is available for the continued growth of the polymer chain. When an alternative reaction occurs which results in the incorporation of a moiety without this reactive hydroxyl group, the ability of the chain to continue the chain extension is terminated. Chains with terminal groups of this type are said to be endcapped. A variety of endcapping reagents have been disclosed in the art, including those described in U.S. Pat. Nos. 4,774,315, 5,028,690, 5,043,203, 5,644,017 and 5,668,202 which are incorporated herein by reference. In general such endcapping reagents are utilized when producing polycarbonates by interfacial processes, rather than melt processes because they can introduce complications to the recovery of various product and recycle streams. In melt processes, therefore, endcapping generally results from the reaction of the extending polymer with free phenol, which is released as a by-product of the polymerization reaction.

The endcapping level of a polycarbonate resin can be expressed a percentage value, by determining the number of chains which are terminated with a reactive hydroxyl group (uncapped) and then taking the remainder of the chain ends as being capped. Such a determination can be made using spectroscopic measurements. The level of endcapping (E/C%) is then given by the formula:

$$E/C\% = (\text{capped chain ends/total chain ends}) \times 100$$

Normal melt processing reaction conditions produce polycarbonate resin products with an endcap level in the range of 80–85%. However, endcap level is not variable which is generally controlled in the Melt process. Indeed, in contrast to interfacial processes where the amount of monofunctional endcapping reactant is used to control the average molecular weight of the finished product, in the melt process molecular weight is controlled by a number of process variables such as temperature, pressure and residence time, but typically not by controlling the endcap level (except in cases where the desired material is fully endcapped). Surprisingly, however, it has now been found that control of this variable permits the production of OQ Melt Polycarbonates with desirable properties, namely low positive static charge and low dust attraction. Since, high static charge impacts CD-manufacturing process negatively by causing yield losses due to disc sticking, dust attraction and non-dye wettability for CD-R applications, this represent a substantial improvement in the quality of the product.

Control of the endcap level can be achieved in two ways: (1) by control of the process parameters such that the amount of free diphenylcarbonate in the melt is increased at least during the latter portions of the reaction to increase the frequency of encapping; and (2) by adding a monofunction reagent which will compete with bisphenol A and free diphenylcarbonate to create endcapped polymers. In the first case, the level of endcapping can be increased by increasing the initial ratio of DPC to BPA, and/or by increasing the temperature and/or residence time in the reactor before the polymerization reaction is quenched. Preferred conditions have a DPC/BPA ratio of at least 1.05, and preferably 1.07 to 1.137, and a temperature in the last reactor of 286–309° C. Residence time can be varied by changing the feed rate of the reactor. The appropriate feed rate will of course vary depending on the size of the reactor. Catalyst concentration and level of vacuum have small effects on the endcap level.

As a model, we used a form of the second approach, in which phenyl chloroformate, which has a non-volatile leaving group, was used to compete with bisphenol A. Because the leaving group is non-volatile, it cannot be readily separated from the reaction (which normally occurs in a reactive distillation column) and would interfere with product performance, recovery of product and recycle streams if used in an actual production of polycarbonate.

Control of the endcap level does not preclude the use of other additives conventionally used in the preparation of polycarbonate resins. Thus, optical disks produced by the method of the invention may include antistatic additives, stabilizers, including UV and heat stabilizers, and mold release.

EXAMPLE 1

To prepare various resins with different levels of endcapping, a 10 gallon glass reactor was charged with 2200 g of a 79.9% endcapped melt resin in 16 liters of methylene chloride. Depending on the extent of endcap desired, a typical preparation was as follows: add phenyl chloroformate (13.55 g (0.087 moles),1.0 mole % based on resin) then triethylamine (13.13 g(0.130 moles), 1.5mole % based on resin). This mixture was stirred at room temperature for 30 minutes then washed with successively with 1.0N HCl (10 liters), 0.3N HCl (10 liters) and DI water (4×10liters). This resin solution was precipitated into methanol (30 liters) using a 30 gallon henschel mixer. The powder was then dried at 120° C. under vacuum for 12 hours. The resulting powder was extruded using a 30 mm TSE at a rate of 15 lbs/hr with a barrel set temperature of 260° C. This material was molded on a Nessie 160 molding machine preparing 3.5 inch dynatup plaques.

Formulations were also prepared utilizing a commercial antistatic agent (Atmer 154) and a mold release agent (Glycerol Monostearate). These additives were added to the pellets directly and compounded on a 30 mm TSE at a rate of 30 lbs/hr. Alternatively the additives could be blended into a powder concentrate using a similar melt flow resin with the powder concentrate added as 5% by weight of the total resin volume while compounding, added in a separate feeder. Compact disks were molded on a Netstal Diskjet 600 at a cycle time of 4.43 seconds Table 1 summarizes the properties of the materials and the disks produced.

The static performance was evaluated on dynatups discs by measuring "as-molded" static charge, as well as a qualitative measurement such as dust attraction.

TABLE 1

Static performance vs % Endcap LXOQ Endcapping

| Added PCF (mol %) | OH (ppm) | E/C (%) | Static (kV)/ Stdev | Dust attraction |
|---|---|---|---|---|
| none (OQC112) | 827 | 79.5 | −2.50 (.32) | -- |
| 0.25 | 554 | 86.6 | −2.15 (.50) | -- |
| 0.50 | 404 | 90.2 | −1.84 (.12) | -- |
| 0.75 | 243 | 94.3 | −1.35 (.10) | − |
| 1.00 | 95 | 97.6 | −1.06 (.13) | + |
| 1.25 | 16 | 99.7 | −0.22 (.18) | ++ |

PCF = Phenyl Chloroformate
E/C (%) = Molar ratio of phenol endgroups to BPA endgroups
Static = Surface Voltage (kV units) for "as-molded" dynatups discs - measured using a Meech Static Field meter. Meter-Surface disc distance: d = 5 cm.- Data corresponds to 10 Dynatups samples.

As illustrated in the Table 1, incremental increase in EC% results in reduction of the observed "as-molded" static charge. We observed however that only after we exceed and EC% of 90% does that static charge decrease lead to a reduction in the observed dust attraction.

EXAMPLE 2

A 250 liter stirred tank reactor was filled with different ratios of Bisphenol-A and Diphenylcarbonate (0.44 kMol DPC), then purged with nitrogen, and the contents were melted at 140° C. Then 0.00044 mole of sodium hydroxide and 0.11 mole of tetramethylammonium hydroxide were added as a catalyst and stirring was continued for 30 min, after which the temperature was raised to 210° C. and the pressure was lowered to 200 torr. After 30 min the temperature was increased to 240° C. and the pressure gradually lowered to 15 torr. After 1 hour at these conditions (IV of product 0.15 dl/g) the reaction product was fed by a gear pump to a horizontal twin-impeller stirred tank (capacity 80 ltrs) reactor at a rate of 40 kg/hr. Polymerization was continued at different temperatures (See table 2), 1.5 torr and a residence time 30 min to achieve different levels of endcapping. The molten product was then fed to a second horizontal twin impeller polymerizer (Temp 290° C.), where quencher was added (6 times Na (mol/mol)) to stop polymerization and to evaporate residual monomers. The molten polymer was then fed by a gear pump to a twin screw extruder (L/D=17.5, barrel temperature 285° C.). The resulting polymer was extruded, additives (heat stabilizer and Release agent) were added and kneaded in. The IV of the polymer thus obtained was: 0.355 dl/g.

TABLE 2

| E/C % | DPC/BPA Ratio | Temp (Last Reactor, ° C.) |
|---|---|---|
| 96 | 1.137 | 309 |
| 90 | 1.073 | 295 |
| 85 | 1.026 | 286 |

Tables 3 and 4 show examples with and without Atmer 154 as an antistatic agent; however we have demonstrated the High EC or High EC+Atmer nations can significantly enhance the antistatic performance for Optical applications.

TABLE 3

CD-Static performance as a function of % EC and Formulation
CD-Static performance

| Formulation GMS (ppm) | Atmer 154 | E/C (%) | Static (kV)/ Stdev | | Dust Attraction |
|---|---|---|---|---|---|
| 400 | 0   | 85 | −5.10 | (0.69) | -- |
| 400 | 250 | 85 |       |        |    |
| 400 | 200 | 90 | −1.70 | (0.69) | ++ |
| 200 | 200 | 90 | +0.23 | (0.46) | ++ |
| 400 | 0   | 96 |       |        |    |
| 200 | 200 | 96 | +1.60 | (0.65) | ++ |
| 400 | 200 | 96 | +0.88 | (0.46) | ++ |

GMS = Glycerol monostereate
Atmer 154 is the ICI Trademark for POE fatty acid ester
Static = Surface Voltage (kV units) for "as-moled" Compact Discs - measured using a Meech Static Field meter. Meter-Surface disc distance: d = 2.5 cm.- Data corresponds to 100 CDs samples.

TABLE 4

DVD- Static performance as a function of % EC and Formulation
DVD-Static performance

| Formulation GMS (ppm) | Atmer 154 | E/C (%) | Static (kV)/Stdev | | Dust Attraction |
|---|---|---|---|---|---|
| 400 | 0   | 85 | −7.59 | (0.40) | -- |
| 400 | 250 | 85 | −7.13 | (0.54) | -- |
| 400 | 0   | 96 | −6.20 | (0.36) | -  |
| 400 | 250 | 96 | −3.51 | (0.23) | ++ |

Static = Surface Voltage (kV units) for "as-molded" DVD Discs - measured using a JCI 140C Static Field meter. Meter-Surface disc distance: d = 4.0 cm.- Data corresponds to 100 DVDs samples.

Based on these results, we conclude that increasing the endcap level for OQ Melt Polycarbonate significantly reduces the as molded-static charge for injection molded parts for Optical Disc applications. High Endcap LX material (>90%) brings a reduction in static charge as well as dust attraction which it is an important CTQ for the CD-industry. Moreover, High EC+Atmer combinations give additional enhancement on Static charge reduction when molding more demanding applications, such as DVD.

We claim:

1. A method for preparing optical quality polycarbonate comprising melt polymerizing a reaction mixture comprising diaryl carbonate and a dihydric phenol while manintaing conditions effective to produce a level of endcapping of at least 90%, wherein the level of at least 90% is produced by a method selected from the group consisting of providing the diaryl carbonate and a dihydric phenol in the reaction mixture at a starting ratio of at least 1.05, addition of a monofunctional endcapping reagent, or a combination comprising at least one of the foregoing methods.

2. The method of claim 1, wherein the monofunctional endcapping reagent is phenylchloroformate.

3. The method of claim 1, wherein the reaction mixture further comprises an antistatic additive.

4. The method of claim 3, wherein the diaryl carbonate is diphenyl carbonate.

5. The method of claim 4, wherein the dihydric phenol is bisphenol A.

6. The method of claim 1, wherein the reaction mixture further comprises an antistatic additive.

7. The method of claim 6, wherein the diaryl carbonate is diphenyl carbonate.

8. The method of claim 7, wherein the dihydric phenol is bisphenol A.

9. The method of claim 1, wherein the diaryl carbonate is diphenyl carbonate.

10. The method of claim 9, wherein the dihydric phenol is bisphenol A.

11. An optical quality polycarbonate resin formed by melt polymerizing a reaction mixture comprising diaryl carbonate and a dihydric phenol, wherein the resin has a level of endcapping of least 90%.

12. The resin of claim 11, further comprising an antistatic additive.

13. Optical information storage media formed from an optical quality polycarbonate resin formed by melt polymerizing a reaction mixture comprising diaryl carbonate and a dihydric phenol, wherein the resin has a level of endcapping of at least 90%.

14. The media of claim 13, further comprising an antistatic additive.

15. The method of claim 2, wherein the starting level is in the range of from 1.07 to 1.137.

16. A method of claim 1, wherein the level of endcapping of at least 90% is produced by having a reactor temperature of 286° C. to 309° C.

17. The resin of claim 11, wherein the level of endcapping of at least 90% is produced by providing the diaryl carbonate and the dihydric phenol in the reaction mixture at a starting ratio of at least 1.05.

18. The resin of claim 17, wherein the ratio is 1.07 to 1.137.

19. The resin of claim 14, wherein the level of endcapping of at least 90% is produced by providing the diaryl carbonate and the dihydric phenol in the reaction mixture at a starting ratio of at least 1.05.

20. The resin of claim 19, wherein the ratio is 1.07 to 1.137.

* * * * *